United States Patent
Hendrickson et al.

(10) Patent No.: US 9,637,005 B2
(45) Date of Patent: May 2, 2017

(54) DISPLAY CONVEYING TROLLEY POSITION TO OPERATOR

(75) Inventors: Matthew L. Hendrickson, Dunlap, IL (US); Donald J. Gilmore, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 908 days.

(21) Appl. No.: 13/435,129

(22) Filed: Mar. 30, 2012

(65) Prior Publication Data

US 2013/0261901 A1    Oct. 3, 2013

(51) Int. Cl.
*B60L 9/00*     (2006.01)
*B60L 5/18*     (2006.01)
*B61K 9/00*     (2006.01)

(52) U.S. Cl.
CPC ............. *B60L 9/00* (2013.01); *B60L 2200/36* (2013.01); *B60L 2240/622* (2013.01); *B60L 2250/10* (2013.01); *B60L 2250/16* (2013.01); *Y02T 10/7291* (2013.01); *Y02T 90/16* (2013.01); *Y02T 90/162* (2013.01)

(58) Field of Classification Search
CPC ...... B60L 5/18; B60L 9/00; B60L 9/16; B60L 5/04; B61D 17/00; G06F 19/00; G06K 9/00; B61L 27/04; H02J 7/00; B61K 9/00
USPC .............. 701/2, 20, 50; 191/2, 87; 324/217; 320/109, 167; 382/100; 307/9.1; 358/3.28; 705/304; 250/559.01; 105/1.5; 180/2.1
See application file for complete search history.

(56) References Cited

U.S. PATENT DOCUMENTS

| | | | |
|---|---|---|---|
| 4,745,997 A * | 5/1988 | Takei | B60L 5/14 191/8 |
| 5,293,947 A * | 3/1994 | Stratton | B60K 6/46 180/2.1 |
| 6,029,104 A * | 2/2000 | Kim | B61L 23/005 104/88.04 |
| 7,340,329 B2 | 3/2008 | Marra et al. | |
| 7,548,804 B2 | 6/2009 | Rossow et al. | |
| 7,941,158 B2 | 5/2011 | Olson | |
| 8,071,967 B2 * | 12/2011 | Watabe et al. | 250/559.01 |
| 2006/0060105 A1 * | 3/2006 | Webster | A63H 19/26 105/1.5 |
| 2007/0000744 A1 * | 1/2007 | Craig et al. | 191/2 |
| 2008/0306662 A1 * | 12/2008 | Herschel | 701/50 |
| 2010/0039067 A1 * | 2/2010 | Hill | B60L 5/42 320/109 |
| 2010/0114404 A1 * | 5/2010 | Donnelly | 701/2 |

(Continued)

FOREIGN PATENT DOCUMENTS

| | | |
|---|---|---|
| CN | 1085169 | 4/1994 |
| CN | 101730773 | 6/2010 |

(Continued)

*Primary Examiner* — Yuri Kan
(74) *Attorney, Agent, or Firm* — Miller, Matthias & Hull (57) ABSTRACT

A display for use in an off-highway truck includes a position element providing an indication to an operator of the off-highway truck to align the off-highway truck with an overhead trolley line as well as a pantograph element providing an indication to the operator to raise or lower a pantograph associated with the off-highway truck to respectively make or break contact with the overhead trolley line. In an optional aspect, an alarm indicator may be provided for signaling an alarm condition to the operator of the off-highway truck.

6 Claims, 5 Drawing Sheets

(56) References Cited

U.S. PATENT DOCUMENTS

| | | | |
|---|---|---|---|
| 2010/0157378 A1* | 6/2010 | Cole et al. | 358/3.28 |
| 2010/0198466 A1* | 8/2010 | Eklund | E02F 9/26 701/50 |
| 2010/0250073 A1* | 9/2010 | McCabe et al. | 701/50 |
| 2010/0253329 A1* | 10/2010 | Arcaini | B60M 1/28 324/217 |
| 2010/0270859 A1* | 10/2010 | Gong et al. | 307/9.1 |
| 2010/0270983 A1* | 10/2010 | Gong | B60L 3/0046 320/167 |
| 2010/0322465 A1* | 12/2010 | Wesche | B60L 5/24 382/100 |
| 2011/0094840 A1* | 4/2011 | Sakita | 191/2 |
| 2011/0311102 A1 | 12/2011 | McDaniel et al. | |

FOREIGN PATENT DOCUMENTS

| | | | |
|---|---|---|---|
| DE | 10256705 A1 * | 7/2004 | B60L 5/36 |
| JP | 07035566 | 2/1995 | |
| WO | 9304887 | 3/1993 | |
| WO | 2009007879 | 1/2009 | |
| WO | 2010121707 | 10/2010 | |

* cited by examiner

DISPLAY CONVEYING TROLLEY POSITION TO OPERATOR

TECHNICAL FIELD OF THE DISCLOSURE

The present disclosure relates to guidance of trolley-driven machines and, more particularly, relates to a display for providing a view of a trolley-driven machine position relative to a trolley line.

BACKGROUND OF THE DISCLOSURE

Although electric power has many benefits for use in industrial material transport machinery, some of these benefits may be offset by the need to carry, charge and maintain a sufficient source of electric power, e.g., a large battery or other charge storage system. In applications having substantially repeated travel patterns, such as in mine work and other similar contexts, trolley line systems eliminate this problem by providing a path along which a travelling machine may receive electric power from one or more power lines (herein referred to as "trolley lines"). Such trolley lines may be placed continuously along a path, or only at certain portions of the path, such as uphill runs, to provide assist power.

In a trolley system, the source of electrical power, which may be a municipal grid or an on-site generator facility, stays fixed, but the trolley-powered machine nonetheless receives power from the power source anywhere along the trolley lines. As such, the efficiencies of electric power may be obtained when needed without the concomitant complications and expense of large batteries. However, one significant limitation of trolley systems is that the trolley-powered machine must track the trolley lines if it is to receive power there from. In a related vein, the apparatus for electrically connecting the trolley-powered machine to the trolley lines, called a "pantograph," must be raised when the trolley line is to be used, and lowered at other times.

Taking into account the above requirements, the use of a trolley system requires the machine operator to both follow the trolley line accurately and to raise and lower the pantograph at the appropriate locations. Failure to meet either requirement can result in a loss of efficiency, since alternative power such as an onboard engine must be used when the trolley-powered machine is not receiving power from the trolley line. Moreover, misdirection of the machine or the pantograph can result in damage to the machine as well as to the trolley line and associated infrastructure, e.g., lines, line poles, transformers, etc.

Although flags may be used to signal the operator regarding locations for raising and lowering the pantograph, and pieces of tape may be applied to the machine windshield to assist the user in "aiming" the machine along the trolley lines, these techniques are not ideal. For example, the use of external visual cues such as these require ample external lighting along the trolley line, including the periphery of the roadway where flags may be placed. Moreover, in certain conditions such as heavy fog or windblown sand, it may be difficult for the operator to clearly see the external visual cues regardless of lighting (e.g., to see the flag beside the roadway or to see the trolley line from between the aiming tapes).

The reference DE10256705 appears to describe a system that detects the electrical conductors of a trolley line by sensing a current in the lines via non-contact means and then steers the truck in response, while potentially displaying the line position to the operator. However, the detection of the lines in such a manner has not particularly effective, and moreover, a user-friendly and effective display system has not taught. Thus, an improved system for operator guidance in a trolley line system is needed.

It will be appreciated that this background section was created by the inventors for the reader's convenience. It is meant to discuss problems and concepts noted by the inventors, and not to discuss or explain prior art unless expressly otherwise noted. Thus the inclusion of any problem or solution in this section is not an indication that the problem or solution is prior art.

SUMMARY OF THE DISCLOSURE

In accordance with one aspect of the present disclosure, a method is provided for guiding an operator of an off-highway truck to facilitate use of a trolley line providing electrical power to the truck. The method includes determining a position of the off-highway truck relative to the trolley line and generating a display within an operator cab of the off-highway truck, the display providing an indication to the operator showing alignment of the off-highway truck to the trolley line.

In accordance with another aspect of the disclosure, an off-highway truck is provided having a pantograph adapted for selectively raising or lowering contacts to respectively make contact or break contact with an overhead trolley line, one or more sensors located and configured to gather data indicative of a position of the off-highway truck relative to the trolley line, and a display generator for providing a display in a cab of the off-highway truck. A controller is linked to the one or more sensors and the display generator, and is configured to cause the display generator to provide a display providing steering guidance to an operator of the off-highway truck to engage the pantograph with the trolley line.

In yet another aspect of the disclosure, a display is provided for use in an off-highway truck. The display includes a position element providing an indication to an operator of the off-highway truck to steer the off-highway truck to align the off-highway truck with an overhead trolley line as well as a pantograph element providing an indication to the operator to raise or lower a pantograph associated with the off-highway truck to respectively make or break contact with the overhead trolley line.

Further features and aspects of the disclosed systems and methods will become apparent from reading the detailed description in conjunction with the attached drawing figures.

While the present disclosure is susceptible to various modifications and alternative constructions, certain illustrative embodiments thereof will be shown and described below in detail. It should be understood, however, that there is no intention to be limited to the specific embodiments disclosed; on the contrary, the intention is to cover all modifications, alternative constructions, and equivalents within the spirit and scope of the present disclosure.

DETAILED DESCRIPTION OF THE DISCLOSURE

Figure 1:
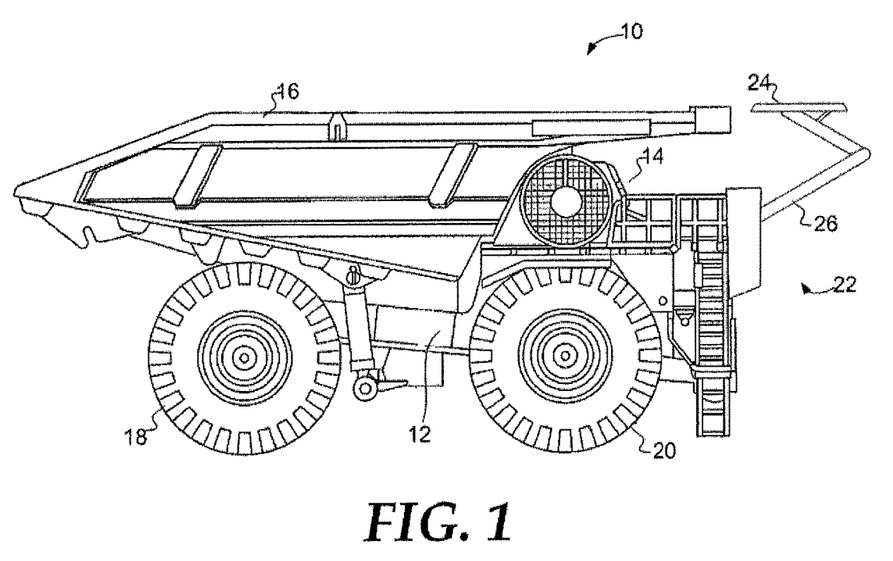
FIG. 1 is an illustration of a side view of a trolley-assisted off-highway truck within which an embodiment of the disclosed principles may be implemented.

The present disclosure relates to a system and method for providing a heads up display to an operator of a trolley-powered off-highway truck to guide the operator in efficiently using the trolley line to power the truck. Referring now to FIG. 1, this figure shows a side view of a trolley-assisted off-highway truck 10 within which an embodiment of the disclosed principles may be implemented. The off-highway truck 10 includes a chassis 12 that supports an operator cab 14 and a bucket 16. The bucket 16 is pivotally connected to the chassis 12 and is arranged to carry a payload when the off-highway truck 10 is in service. An operator occupying the operator cab 14 can control the motion and the various functions of the off-highway truck 10.

The chassis 12 supports various drive system components. These drive system components are capable of driving a set of drive wheels 18 to propel the off-highway truck 10. A set of idle wheels 20, optionally powered, can steer using known methods such that the off-highway truck 10 can be directed by the operator. In one embodiment, the drive wheels 18 are arranged at the rear of the chassis 12 and the idle wheels 20 are arranged at the front of the chassis 12. Even though the off-highway truck 10 includes a rigid chassis with powered wheels for motion and steerable wheels for steering, it will be appreciated that other machine configurations can be used. For example, such configurations may include an articulated chassis and/or a chassis supporting a plurality of driven wheel sets.

The off-highway truck 10 includes a self-contained power source such as an engine and fuel and/or electric motor and battery. In this way, the off-highway truck 10 may be self-powered in environments where an external power source is not available. Often however, it is more efficient to make use of external power when available.

To this end, the off-highway truck 10 further includes a mechanism for receiving power from a trolley line. In particular, the off-highway truck 10 includes an operator-controlled pantograph 22. The pantograph 22 includes a plurality of contacts 24 (one visible in this view), each being supported by an associated articulated raising mechanism 26. The operator controls the raising mechanism 26 from within the operator cab 14, such that when there is no trolley line overhead, or it is not desired to use trolley power, the pantograph 22 remains lowered (as shown), and when there is a trolley line overhead and it is desired to use trolley power, the pantograph 22 is raised such that the plurality of contacts 24 come into contact with the conductors of the trolley line.

As used herein, the term "trolley line" encompasses a single line or a set of lines, e.g., a pair, used simultaneously by a machine. In addition, although alignment with a set of trolley lines implies alignment with each conductor in the set, the displays and display elements according to the principles described herein may show the trolley line of interest as a single line or as a set of lines without departing from the scope of the described principles.

As noted above, in order to use trolley line power, an operator of an off-highway truck similar to the off-highway truck 10 of FIG. 1 must ensure that the truck is aligned with the trolley line and that the plurality of contacts 24 of the pantograph 22 underlie the line before raising the pantograph 22. However, in an embodiment of the disclosed principles, a user guidance display provides the operator with a visual representation of the off-highway truck 10, and/or the pantograph 22 thereof, in relation to the trolley line. In one embodiment, the user guidance display provides visual cues for alignment along the trolley line. In a further embodiment, visual cues provided include alignment cues as well as cues for positioning in the travelling direction, e.g., to show whether the pantograph 22 underlies the trolley line in the direction of travel.

Figure 2:
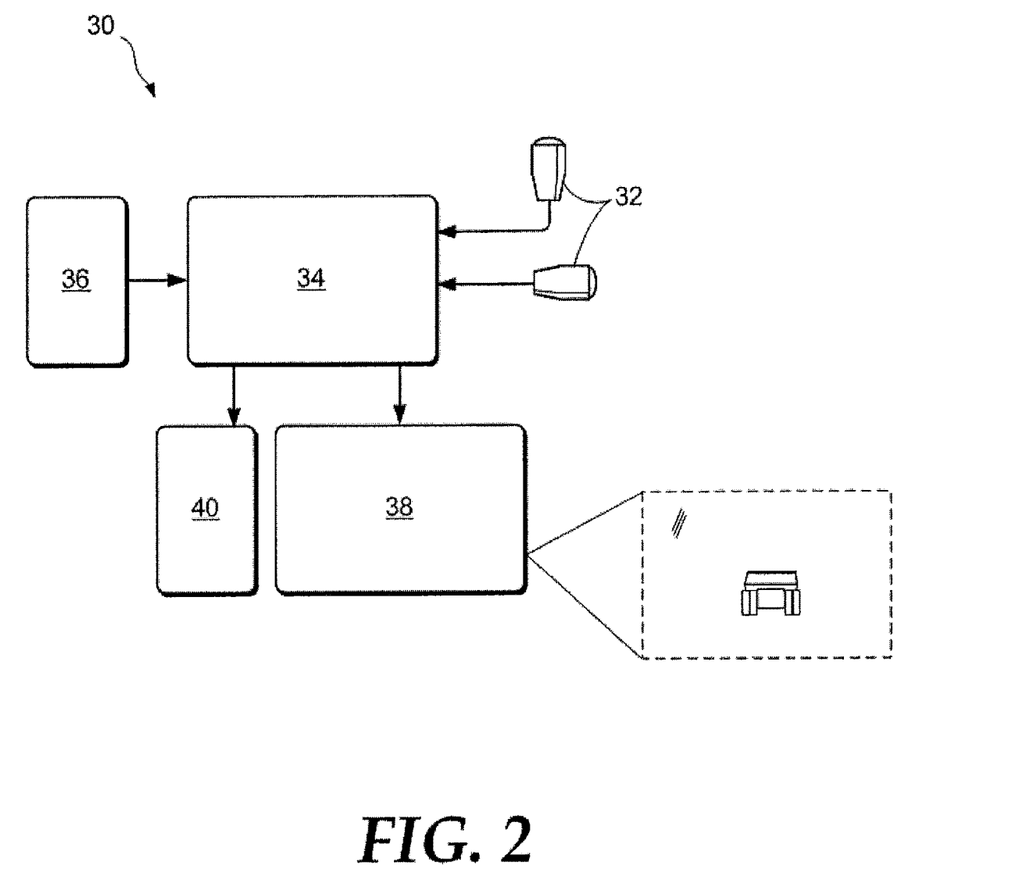
FIG. 2 is a schematic diagram showing a sensing and display system for an off-highway truck in an illustrative embodiment.

In this connection, FIG. 2 is a schematic diagram showing a sensing and display system 30 of the off-highway truck 10 in an illustrative embodiment. The sensing and display system 30 includes one or more distance sensors 32 that may include one or both of a sideward facing sensor and an upward facing sensor. The one or more distance sensors 32 may be of any suitable design including acoustical, optical, LIDAR, LADAR, etc.

In an embodiment, the sideward facing one of the sensors 32 may provide alignment-related information by sensing a distance to the side of the roadway, e.g., by sensing roadside features (herein, "fixed ground features") such as trolley line poles. Such sensors my also provide information related to the start and stop of the overhead lines if such information is also embodied in the roadside features. For example, markers of certain material, color, reflectance, etc. may be placed on poles coinciding with the trolley line start and the trolley line end.

The one or more distance sensors 32 are communicatively linked to a controller 34 and a signal from each of one or more distance sensors 32 is provided to the controller 34. The controller 34 may be a dedicated controller or may be embodied in an existing controller such as a machine controller, engine controller, power management controller, etc. In an embodiment, the controller 34 operates by reading computer-executable instructions, e.g., code or programs, from a non-transitory computer-readable medium, e.g., an optical or magnetic disc memory, CD, DVD, flash drive, etc., and executing those instructions. Data used by the controller 34 during execution may be retrieved from the computer-readable medium or from a peripheral source such as a user interface and/or the one or more distance sensors 32, other machine sensors, etc.

In an alternative embodiment, the position data is generated by a GPS sensor module 36. In this embodiment, the location of the trolley line relative to the known vehicle position may be generated by an overlay, wherein the trolley line position is predetermined and encoded in the overlay (herein a "position-encoded overlay"). The GPS sensor module 36 is communicatively linked to the controller 34 and provides a signal to the controller 34.

The controller 34 derives a position relationship between the off-highway truck 10 and the trolley line. For example, the off-highway truck may be centered on the trolley line, at a position to the left of but still on the trolley line, at a position off the line to the right, and so on. The position relationship data is communicated from the controller 34 to an image generator 38. The image generator 38 converts the position relationship data into a display to convey to the user the relative position of the off-highway truck 10 and the trolley line.

In an embodiment, the image generator 38 is configured to provide a heads-up display (herein "HUD") to the operator via a windshield of the off-highway truck 10. In this embodiment, the image generator 38 provides a transparent display that presents data without requiring the operator to look away from the roadway in front of them. Although any suitable HUD technology may be used, in an embodiment the HUD is generated by the image generator 38 as driver signals to one or more LEDs, and LCD screen, or other suitable light source.

While the examples herein predominantly describe use of a heads up display, in an alternative embodiment, the same structures and processes are applied in the context of a different display technology, such as a display shown on a display screen within the operator cab rather than via a heads up display. Thus, the invention is not limited to the use of a heads up display accept as otherwise expressly indicated in the claims.

The lighted image device is located out of the operator's immediate line of sight but is positioned such that the emitted image is reflected from the windshield into the operator's field of view. Focusing optics may be utilized in the image path prior to striking the windshield such that the image light is collimated and appears to be focused at infinity. This enables the operator to view the information without changing focus depth or view point. In this way, the, the operator may simultaneously view both the roadway outside the off-highway truck 10 and any positioning information generated by the image generator 38.

In a further embodiment, an audible alarm generator 40 is provided to generate an audible alarm indicating certain position relationships between the off-highway truck 10 and the trolley line. For example, if the off-highway truck is centered on the trolley line, the audible alarm generator 40 may be silent, whereas if the off-highway truck is too far to the left or right and in danger of hitting infrastructure or disengaging from the line, the audible alarm generator 40 may provide a loud alarm to warn the operator. The alarm function may be provided in conjunction with the HUD in an embodiment.

Figure 3:
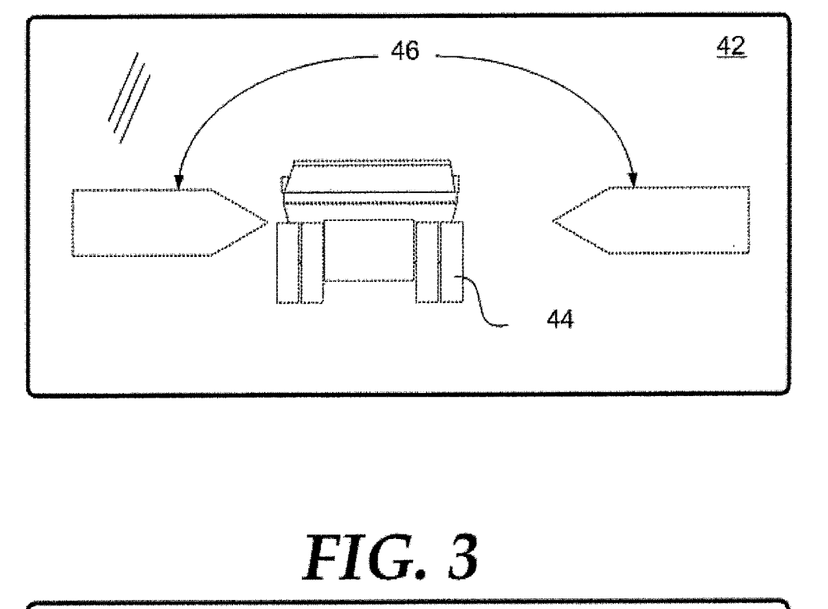
FIG. 3 is a screen representation of a HUD image in accordance with one aspect of the disclosed principles.
Figure 4:
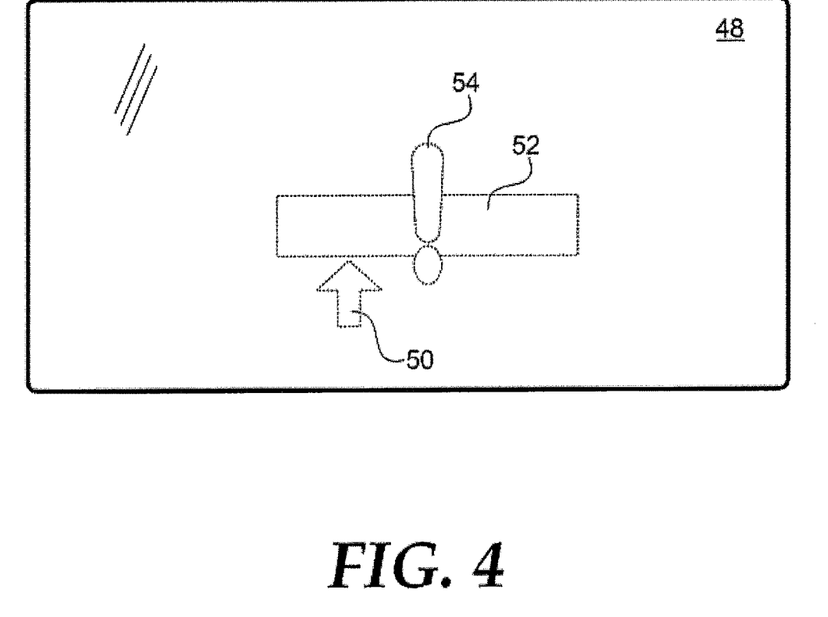
FIG. 4 is a screen representation of a HUD image in accordance with a further aspect of the disclosed principles.
Figure 5:
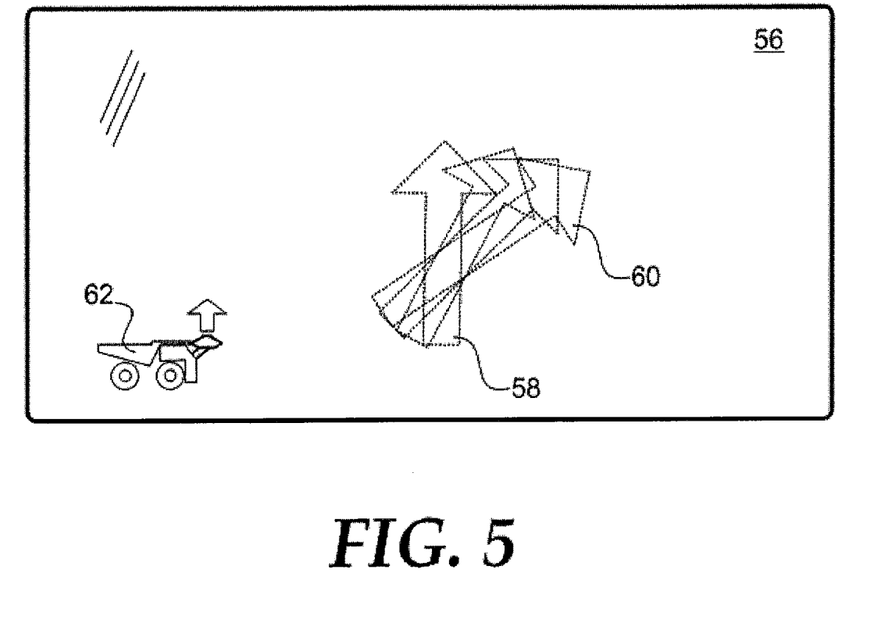
FIG. 5 is a screen representation of a HUD image in accordance with yet a further aspect of the disclosed principles.

While the exact content of the HUD image is not critical, a number of exemplary display types are shown in FIGS. 3-5. It will be appreciated that each image type, when shown in a HUD, is transparent such that the operator will also be able to view the roadway and the environment around the off-highway truck 10.

Turning to FIG. 3, the illustrated HUD image 42 includes a machine position indicator 44 and a trolley line indicator 46. In the illustrated embodiment, the machine position indicator 44 is a simplified truck rear view, and the trolley line indicator 46 is pair of markers. In operation, the trolley line indicator 46 remains in the same location, while the machine position indicator 44 moves laterally relative to the markers of the trolley line indicator 46 to illustrate for the operator the degree to which the off-highway truck 10 is within lateral range of the trolley line. Thus, for example, in the illustrated view, the off-highway truck 10 is located to the left of center, indicating that the operator should steer to the right to keep the pantograph 22 in contact with the trolley line.

In an alternative embodiment, a first alternative HUD image 48 includes a symbolic machine position indicator 50 and a symbolic trolley line indicator 52 as shown in FIG. 4 or otherwise. In the illustrated embodiment, the symbolic machine position indicator 50 is comprised of an arrow and the symbolic trolley line indicator 52 is comprised of a bar. While different implementations may interpret the symbolic representations differently, in an embodiment, the arrow of the symbolic machine position indicator 50 must remain pointed at some portion of the bar of the symbolic trolley line indicator 52 for the off-highway truck to be within lateral range of the trolley line.

While the figures herein are in black and white, it will be appreciated that the position indicators may be colored and/or may change color, pattern, or shape when a warning is given, e.g., the arrow of the symbolic machine position indicator 50 may flash and/or change to a red color from a green color when it nears and edge of the bar of the symbolic trolley line indicator 52.

Additionally, an alarm indicator element may be displayed in order to announce an alarm condition. For example, a flashing exclamation point 54 may be displayed in the HUD 48 when the off-highway truck 10 is else to becoming laterally out of range of the trolley line. As noted above, alarm conditions may also be indicated by an audible alarm or announcement.

In some embodiments, a single indicator may be used to convey relative position. In the illustrated embodiment of FIG. 5, a single arrow 58 is displayed in the second alternative HUD 56. In this embodiment, the direction of the arrow indicates the direction of correction needed (herein, "steering direction"). For example, when the arrow is in position 60, this indicates to the operator that steering correction to the right is needed in order to stay within range of the trolley line.

In a further embodiment, a HUD includes a visual element to instruct the operator to raise or lower the pantograph 22 of the off-highway truck 10, as illustrated by pantograph indicator 62 in second alternative HUD 56. In the illustrated state, the pantograph indicator 62 indicates that the pantograph 22 should be raised. If the pantograph were to be lowered, the pantograph indicator 62 may appear the same but for instead displaying a downwardly directed arrow. In the illustrated configuration, the combined information provided by the second alternative HUD 56 in FIG. 5 to the operator is to steer to the right and raise the pantograph 22. As noted above, this and the other exemplary HUD configurations are given for purposes of illustration, and other visual representations may be used instead in an implementation of the disclosed principles.

Figure 6:
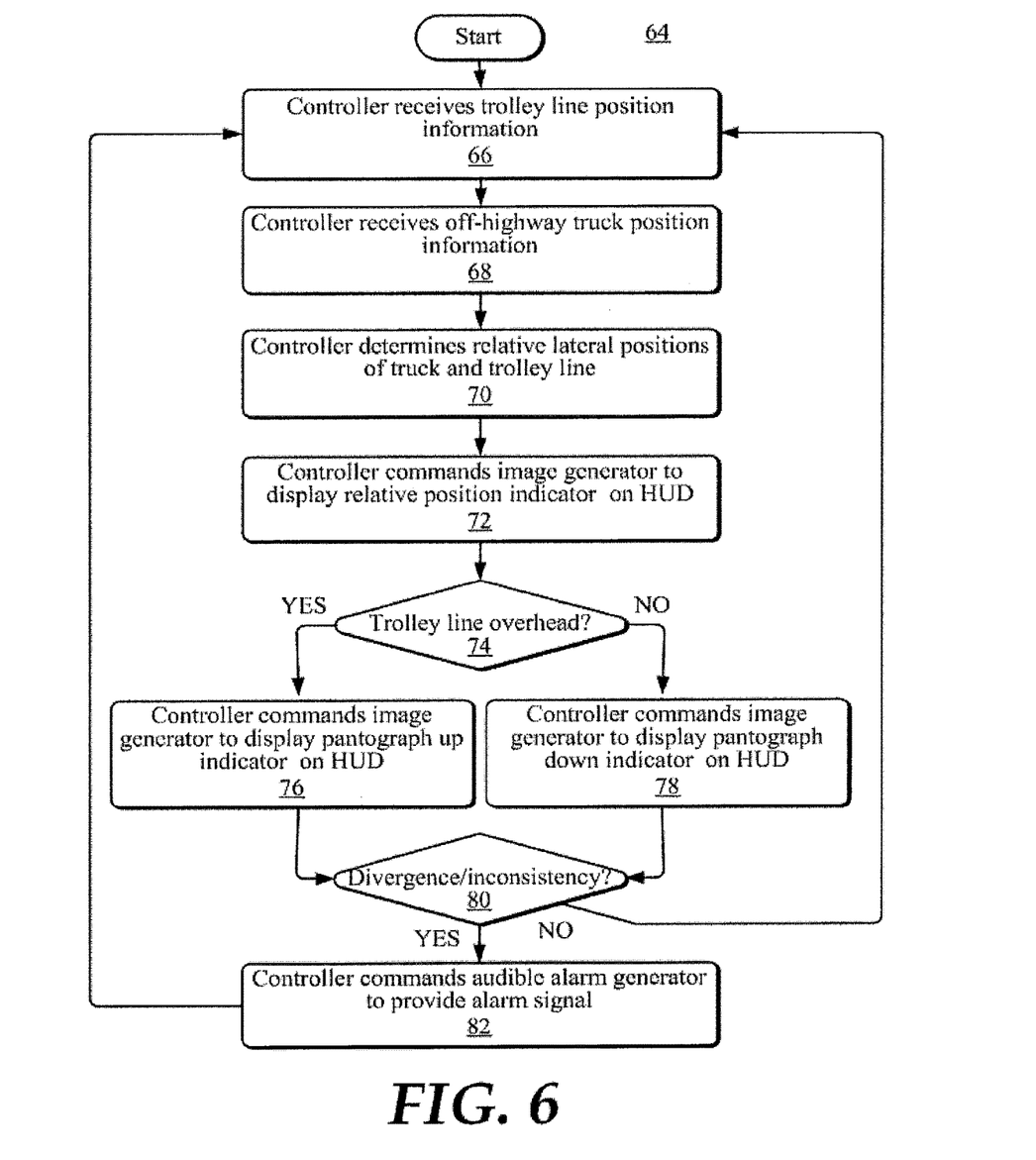
FIG. 6 is a flow chart showing a process for providing HUD guidance to an operator of a trolley-powered off-highway truck based on truck and trolley line positions.

Turning to an illustrative procedure executed by the controller 34, the flowchart FIG. 6 illustrates a process 64 for providing HUD guidance to an operator of a trolley-powered off-highway truck by using truck and trolley line absolute positions. The process 64 is given using elements of the hardware configuration illustrated in FIG. 2, but it will be appreciated that alternative hardware configurations may be used, and that appropriate modifications to process 64 may be made in keeping with such hardware modifications.

At stage 66 of the process 64, the controller 34 receives trolley line position information. This information may be received from an appropriate sensor or sensor set, or may be provided from a stored encoded overlay, e.g., encoding the trolley line path by way of GPS coordinates or the like. In an embodiment, the trolley line position information indicates both whether or not the trolley line has begun or ended as well as the lateral position of the trolley line relative to the direction of travel.

At stage 68, which may be executed before, after, or in parallel with stage 66, the controller 34 receives off-highway truck position information. Again, this information may be received from an appropriate sensor or sensor set, e.g., sensors 32, or may be received from another source such as the GPS sensor module 36.

Having identified the locations of the trolley line and the truck, the controller 34 determines the relative positions of the truck and trolley line in stage 70. In an embodiment, the relative positions are determined as a fraction of full range and a lateral direction. Thus, for example, when the truck is near the left end of the range before contact with the trolley line is lost, the position may be represented as (direction, amount)=(left, 95%). Similarly, a centered position may be represented as (left, 0%) or (right, 0%). A further aspect of the relative positions in an embodiment indicates whether the trolley line is currently overhead, i.e., whether it is appropriate to have the pantograph up or down.

Having determined the relative positions of the trolley line and truck, the process 64 moves to stage 72, wherein the controller 34 provides commands and data to the image generator 38 to display a relative position indicator on the HUD, which may comprise multiple position elements as in FIGS. 3-4 or a single position element as in FIG. 5.

At stage 74, the controller 34 determines from the relative position information whether the trolley line is overhead. If the trolley line is overhead, the controller 34 instructs the image generator 38 at stage 76 to display a "pantograph up" indicator, whereas if the trolley line is not overhead, then the controller 34 instructs the image generator 38 at stage 78 to display a "pantograph down" indicator. The pantograph up and pantograph down indicators may utilize a graphical element similar to pantograph indicator 62 in second alternative HUD 56 of FIG. 5 or otherwise.

In an embodiment wherein alarm notifications are provided to the operator, the controller 34 determines at stage 80 whether any position information indicates an impending divergence of or inconsistency in the truck or pantograph position and the trolley line position range. For example, the off-highway truck 10 may be connected to the trolley line and moving laterally away from center near the end of the lateral extent of the trolley line just prior to disconnection. Alternatively, the truck may be arriving at the start of a trolley-powered zone with the pantograph still up from the last such zone. If either the truck position or pantograph position results in divergence or inconsistency, the controller 34 commands the image generator 38 and/or the audible alarm generator 40 to provide an alarm signal to the operator at stage 82.

From stage 82, or from stage 80 if no divergence or inconsistency is found, the process 64 returns to stage 66 to renew position information and update the operator display. It will be appreciated that stages 66 and 68 may be eliminated if the sensor configuration is such as to provide relative position information directly to the controller 34. Moreover, as noted above, various steps and operations may be altered in content or order as needed in any given implementation depending upon the precise hardware configuration being used to implement the disclosed principles.

INDUSTRIAL APPLICABILITY

In general, the present disclosure sets forth a system and method for providing a heads up display to an operator of a trolley-powered off-highway truck to guide the operator in efficiently using the trolley line to power the truck. The HUD allows the operator to continue to view the environment in front of the truck while receiving directions regarding positions of the truck relative to the trolley line.

Thus, in an embodiment, the HUD includes a position indicator which conveys to the operator the relative position of the truck under the trolley line so that the operator may steer the truck to remain substantially centered under the line. Moreover, in an embodiment, the HUD provides an indication of when the pantograph of the truck should be raised or lowered to avoid damage to the lines or pantograph while allowing efficient use of trolley power.

In a further embodiment, an alarm indication is provided to the operator via the HUD when conditions warrant. For example, an alarm condition may occur when the truck is drifting laterally to an extent that it will soon run off the trolley line, or when the pantograph is already raised as the truck approaches a trolley-powered run after traversing a non-trolley-powered run.

It will be appreciated from the foregoing that the present disclosure provides an effective and efficient mechanism for guiding a truck operator to maintain contact between a pantograph and trolley line when the trolley line is available. While only certain embodiments have been set forth, alternatives and modifications will be apparent from the above description to those skilled in the art. These and other alternatives are considered equivalents and within the spirit and scope of this disclosure and the appended claims.

What is claimed is:

1. A method for guiding an operator of an off-highway truck to facilitate use of a trolley line for providing electrical power to the truck, the method comprising:
    determining a position of the off-highway truck relative to the trolley line; and
    generating a display within an operator cab of the off-highway truck, the display including a graphical element showing alignment of the off-highway truck to the trolley line;
    wherein the display includes a first visual element representing the off-highway truck and a second visual element representing a lateral range of the trolley line.

2. The method for guiding an operator of an off-highway truck according to claim 1, wherein the display includes a visual element representing a steering direction to allow the off-highway truck to remain powered by the trolley line.

3. The method for guiding an operator of an off-highway truck according to claim 1, wherein the display includes a pantograph indicator element indicating whether the operator is to raise or lower a pantograph associated with the off-highway truck.

4. The method for guiding an operator of an off-highway truck according to claim 1, wherein the display further includes an alarm indicator element for indicating that an alarm condition exists.

5. An off-highway truck having a self-contained power source for being selectively powered by a trolley line and by the self-contained power source, the off-highway truck comprising:
    a pantograph adapted for selectively raising or lowering contacts to respectively make contact or break contact with an overhead trolley line;
    one or more sensors located and configured to gather data indicative of a position of the off-highway truck relative to the trolley line;
    a display generator for providing a display in a cab of the off-highway truck; and
    a controller linked to the one or more sensors and the display generator, the controller being configured to cause the display generator to provide a display providing steering guidance to an operator of the off-highway truck to engage the pantograph with the trolley line;

wherein the display includes a pantograph indicator element indicating whether the operator is to raise or lower the pantograph.

6. A display for use in an off-highway truck, the display comprising:
  a position element providing an indication to an operator of the off-highway truck to steer the off-highway truck to align the off-highway truck with an overhead trolley line; and
  a pantograph element providing an indication to the operator to raise or lower a pantograph associated with the off-highway truck to respectively make or break contact with the overhead trolley line.

* * * * *